Jan. 23, 1962    A. VANWERSCH ET AL    3,018,126
CONNECTING STRUCTURE FOR BEAMS OF
A ROOF SUPPORT OR THE LIKE
Original Filed May 23, 1955
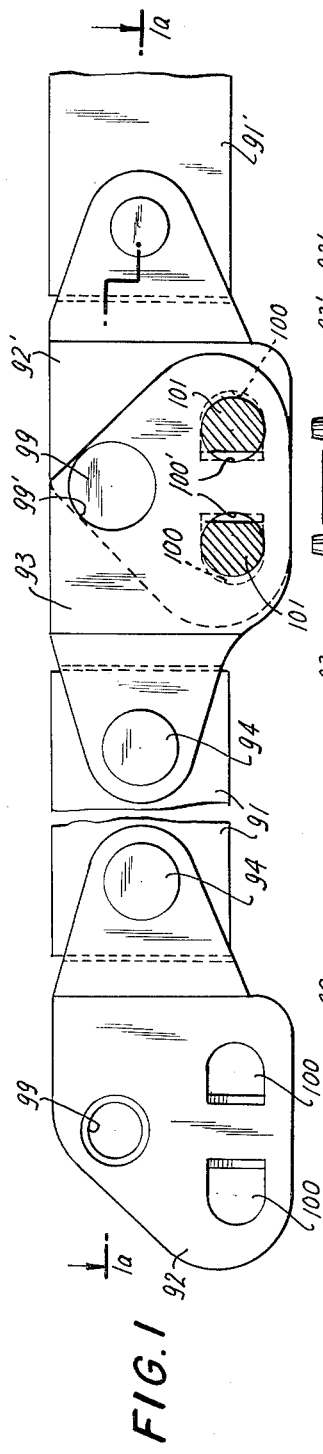
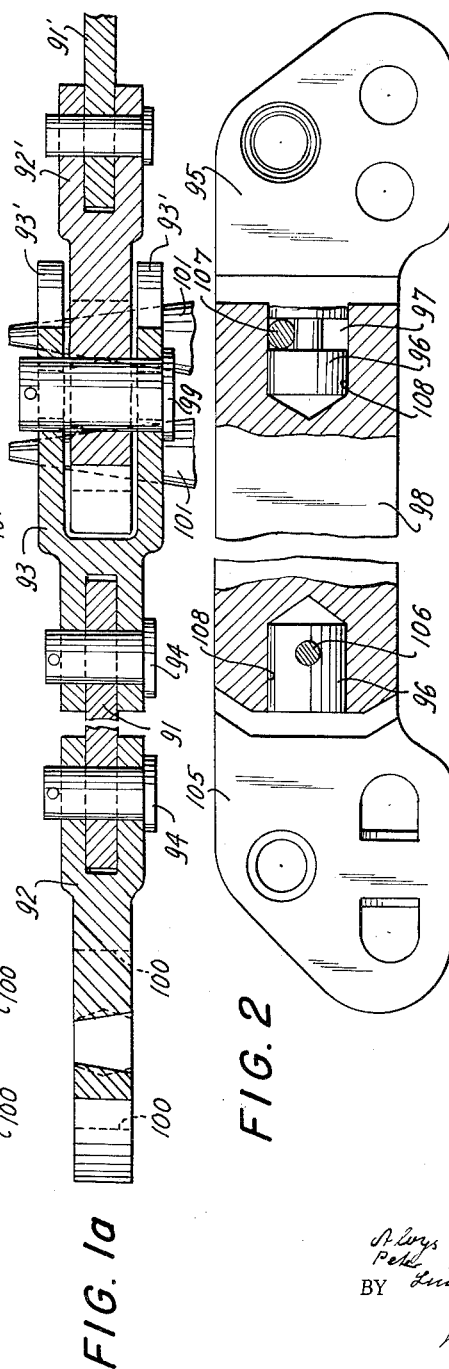
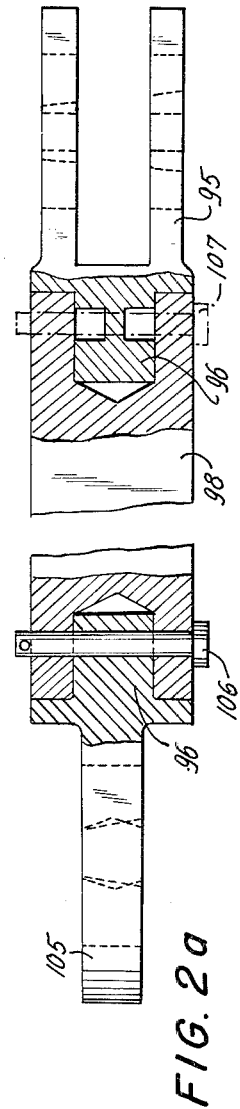
INVENTORS
Aloys Vanwersch,
Peter Vanwersch, and
BY Ludwig Vanwersch
Michael S. Striker
Attorney – # United States Patent Office 3,018,126
Patented Jan. 23, 1962

3,018,126
CONNECTING STRUCTURE FOR BEAMS OF A ROOF SUPPORT OR THE LIKE
Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204, now Patent No. 2,991,097, dated July 4, 1961. Divided and this application Dec. 24, 1958, Ser. No. 782,853
In France July 8, 1948
Public Law 619, Aug. 23, 1954
Patent expires July 8, 1968
3 Claims. (Cl. 287—99)

This application is a divisional application of our copending Serial No. 510,204, filed on May 23, 1955, now Patent 2,991,097.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the obects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a removably connected bifurcated end piece provided with a pair of spaced walls each of which is formed with openings, the openings of one wall being aligned with those of the other wall. A second beam has a removably connected end piece extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side elevational view illustrating one possible manner of interconnecting a pair of beams;

FIG. 1a is a sectional view taken along line 1a—1a of FIG. 1 viewed in the direction of the arrows;

FIG. 2 is a fragmentary, partly sectional view in side elevation of a modified detail of FIG. 1; and FIG. 2a is a partly sectional plan view of the embodiment of FIG. 2.

Referring now to the drawings, and more particularly to FIGS. 1 and 1a, it will be seen that the beam 91 is provided at one end with a removably connected bifurcated end piece 93 having a pair of spaced walls 93', 93'. Removably connected end piece 92' at one end of a beam 91' is adapted to be inserted between the walls 93' of end piece 93. The beams 91 and 91' are supported in a known way by suitable props not shown in the drawing and serving to hold the beams against the roof of a mine shaft or the like. The wall of end piece 93 and the end pieces 92, 92' are respectively formed with openings 99' which are alignable and through which a pivot pin 99 can be inserted, so that in the assembled condition, beams 91 and 91' are pivotally connected for angular movement with respect to each other. The walls of end pieces 92 and 92' are furthermore formed with pairs of openings 100 and the spaced walls 93' of end piece 93 are respectively formed with aligned pairs of openings 100' so that each end piece is equipped with at least three openings respectively located at the corners of a triangle. Wedge members 101 extend through two sets of aligned openings respectively, that is through the aligned openings 100' in the spaced walls 93' and through the openings 100 in end piece 92' located below pivot pin 99 to lock the end pieces 93 and 92' and therewith the beams 91 and 91' in an angular position.

It will be noted that the openings 100 in end pieces 92 and 92' through which the wedge members extend are larger and of different configuration than the openings 100' in end piece 93.

End pieces 92, 93 and 92' are provided with bifurcated ends which receive the ends of beams 91 and 91' respectively pins 94 interconnecting the end pieces to the beams so that if desired the pins 94 may be removed and the beams 91, 91' inverted and reconnected to the end pieces 92, 93, and 92'. The end pieces 92, 93, and 92' may, for example, be made of strong metal such as steel, while the beams 91 and 91' may be advantageously made of light metal.

A further manner of interconnecting end portions to a beam in a removable manner is indicated in FIGS. 2 and 2a where the beam 98 is provided at the ends with removable end pieces 95 and 105 respectively.

End piece 105 which is otherwise similar to end piece 92 in FIG. 1 is equipped with a cylindrical plug 96 insertable in a mating axial recess 108 in beam 98. End piece 105 is fastened to beam 98 by a pin 106 which passes through an opening in the outer wall of beam 98 which registers with a corresponding transverse bore in plug 96. The end piece 105 is thus secured both against rotation and against axial displacement relative to beam 98. When it is desired to reverse the position of end piece 105 on beam 98, the pin is withdrawn until it releases the plug 96, the end piece 105 is turned through an angle of 180° and the pin 106 is re-inserted, whereby the relative position of beam 98 and end piece 105 is again fixed.

End piece 95 is equally provided with a cylindrical plug 96' for insertion in a mating recess 108 in beam 98. Plug 96 is formed with an annular groove 107 through which a pin 107 secured in the walls of beam 98 passes tangentially. Pin 107 thus secures end piece 95 against axial displacement relative to beam 98, but permits rotation of the end portion 95 on beam 98.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalance of the following claims.

What is claimed as new and desired to be secured by Letters Patent is:

1. In a supporting structure, in combination a first beam having a bifurcated end piece provided with a pair of spaced walls each of which is formed with an opening, the opening of one of said walls being aligned with that of the other of said walls; a second beam having an end piece freely extending between said walls of said bifurcated end piece of said first beam and formed with an opening aligned with said openings in said walls, at least one of said end pieces on said first and second beam being removably connected to the respective beam; a pivot pin extending through said openings in said end pieces of said first and said second beam for turnably fastening said beams to each other; locking means for securing the relative angular position of said beams; and connecting means for releasably securing said removable end piece to the respective beam against relative axial displacement.

2. In a supporting structure, in combination, a first beam having a bifurcated end piece provided with a pair of spaced walls each of which is formed with three openings located at the corners of a triangle with the openings of one wall aligned with those of the other wall; a second beam having an end piece extending between said pair of spaced walls and formed with three openings aligned with those of said walls to provide three sets of three aligned openings; a pivot pin extending through one set of openings; a pair of wedge members respectively extending through the other two sets of openings, the end piece of one of said beams being separate therefrom and terminating in a cylindrical projection formed with an annular recess, said one beam being formed with a cylindrical recess receiving said cylindrical projection; and a pin fixed to said one beam and extending through a portion of said annular recess.

3. In a supporting structure, in combination, a first beam having a bifurcated end piece provided with a pair of spaced walls each of which is formed with three openings located at the corners of a triangle with the openings of one wall aligned with those of the other wall; a second beam having an end piece extending between said pair of spaced walls and formed with three openings aligned with those of said walls to provide three sets of three aligned openings; a pivot pin extending through one set of openings; and a pair of wedge members respectively extending through the other two sets of openings, said end pieces of said beams being separate from and respectively fixed removably to the same.

References Cited in the file of this patent

FOREIGN PATENTS 1,009,905    France _____ Mar. 12, 1952